US010133601B2

(12) United States Patent
Apparao et al.

(10) Patent No.: US 10,133,601 B2
(45) Date of Patent: Nov. 20, 2018

(54) MEMORY MANAGEMENT

(71) Applicant: Intel Corporation, Santa Clara, CA (US)

(72) Inventors: Padmashree K. Apparao, Portland, OR (US); Zhen Zhou, Shanghai (CN); Thomas L. Carr, Newberg, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/086,631

(22) Filed: Mar. 31, 2016

(65) Prior Publication Data

US 2017/0286171 A1 Oct. 5, 2017

(51) Int. Cl.
| | | |
|---|---|---|
| *G06F 9/46* | (2006.01) | |
| *G06F 9/50* | (2006.01) | |
| *G06F 9/455* | (2018.01) | |
| *G06F 12/02* | (2006.01) | |
| *G06F 9/48* | (2006.01) | |

(52) U.S. Cl.
CPC ........ *G06F 9/5016* (2013.01); *G06F 9/45558* (2013.01); *G06F 9/485* (2013.01); *G06F 9/5022* (2013.01); *G06F 12/023* (2013.01); *G06F 2009/45583* (2013.01); *G06F 2209/5019* (2013.01); *G06F 2209/542* (2013.01); *G06F 2212/1044* (2013.01)

(58) Field of Classification Search
CPC .. G06F 9/5016; G06F 9/45558; G06F 12/023; G06F 2009/45583; G06F 2212/1044; G06F 9/485; G06F 9/5022; G06F 2209/5019; G06F 2209/542
USPC .......................................................... 718/104
See application file for complete search history.

(56) References Cited

U.S. PATENT DOCUMENTS

| | | | | | |
|---|---|---|---|---|---|
| 6,038,596 | A | * | 3/2000 | Baldwin | .................. G06F 9/44 709/203 |
| 6,324,546 | B1 | * | 11/2001 | Ka | ...................... G06F 11/3476 707/693 |
| 6,618,820 | B1 | * | 9/2003 | Krum | ..................... G06Q 30/02 714/13 |
| 2016/0092272 | A1 | * | 3/2016 | Karaje | .................. G06F 9/5011 718/104 |

* cited by examiner

*Primary Examiner* — Camquy Truong
(74) *Attorney, Agent, or Firm* — Schwegman Lundberg & Woessner, P.A.

(57) ABSTRACT

System and techniques for memory management are described herein. A request for an adjusted process-value for a process may be received. Here, the adjusted process-value may be used to compare resident processes to determine which resident process will be terminated in certain circumstances. In response to the request for the adjusted process-value, a launch-time weight for the process may be obtained. The launch-time weight may be combined with a process-value to create an adjusted process-value. The adjusted process-value may then be returned to the requestor.

19 Claims, 4 Drawing Sheets

MEMORY MANAGEMENT

TECHNICAL FIELD

Embodiments described herein generally relate to computer memory and more specifically to memory management.

BACKGROUND

Memory management addresses the allocation, addressing, and reclamation of memory resources for applications in a computer system. Memory management supports allocating memory to processes (e.g., applications, apps, etc.) to store state data, execution blocks, etc., that permit the process to execute. Memory management is generally performed by an operating system (OS), but may be assisted by a variety of hardware, such as memory management units (MMUs) and memory controllers.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
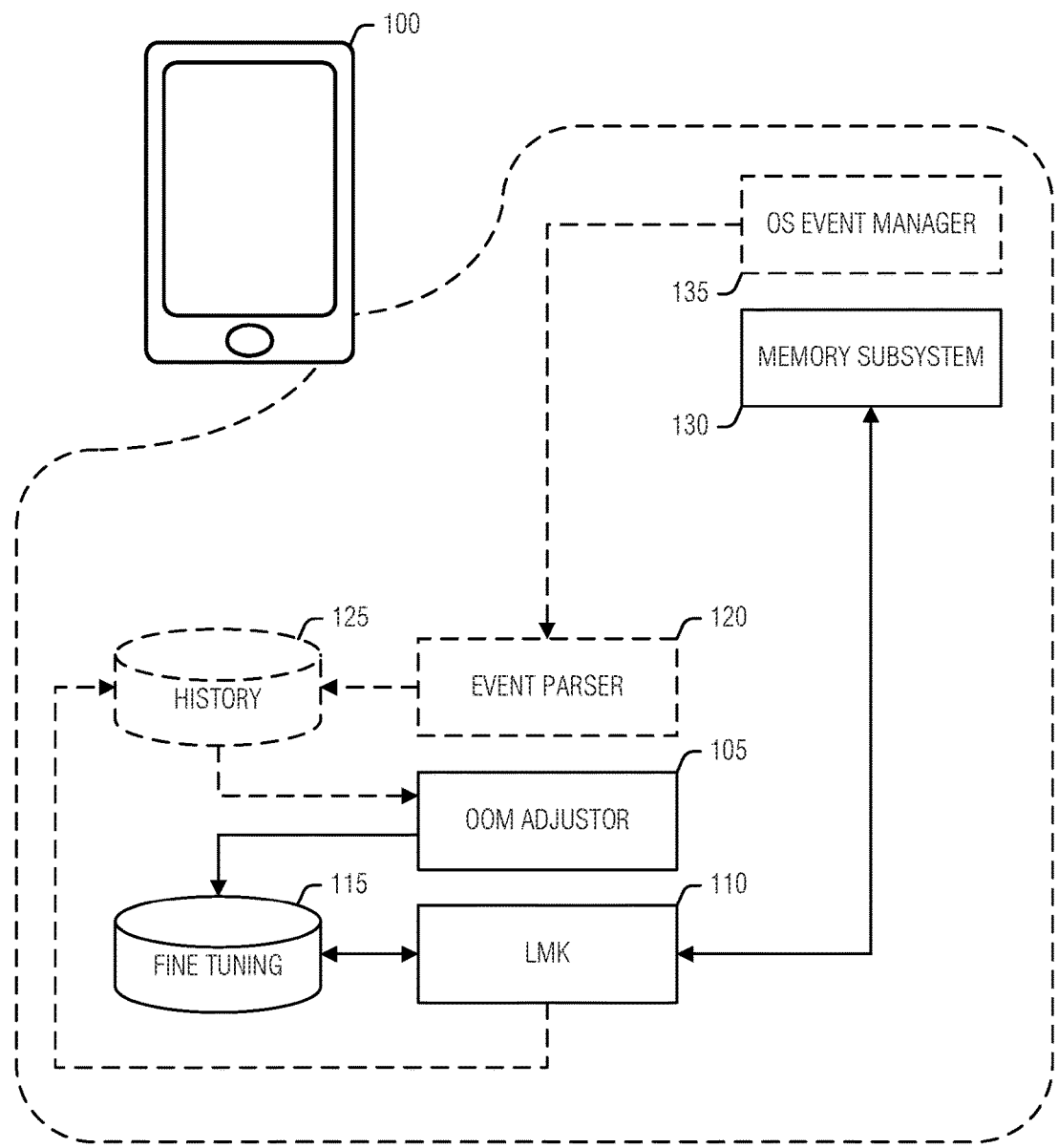
FIG. 1 is a block diagram of an example of device for memory management, according to an embodiment.

Memory management, as opposed to system storage management that would be performed for devices such as hard drives, generally addresses a limited resource that is required to execute a process. Without the memory, the process data and execution instructions are not available to the hardware to implement the corresponding application. In some operating environments, such as smart phones or other limited resource (e.g., processing power, storage space, screen space, etc.) process startup and shutdown don't necessarily correspond to the user directives for each. For example, in a mobile operating system, even when the user quits the application, the application process (e.g., operating state) may still exist in the system, as opposed to the code merely existing in storage. This technique allows the process to quickly resume when the user, for example, switches back to that application. However, as the number of open (e.g., executing, resident, etc.) applications increases, system memory may become insufficient. In this case, shutting down (e.g., killing, halting, etc.) applications frees memory resources for new processes. Generally, deciding whether to kill some processes and, if so, which processes is the responsibility of an operating systems memory manager (e.g., the Low Memory Killer (LMK)).

In Linux, memory is arranged in page unit distribution. The following flow of system calls illustrate the attempted allocation of memory and the resulting evaluations to determine which process to kill in order to release memory:

```
alloc_pages( )
    → out_of_memory( )
        → select_bad_process( )
            → badness( )
```

Although the current LMK procedure efficiently frees memory (e.g., by terminating processes with large memory footprints), it does not account for user experience. Specifically, LMK does not currently consider the impact to the user of killing a specific application process. For instance, LMK does not consider application launch time when making choices.

The previous LMK type techniques rely on an out-of-memory (OOM) adjustment value OOM_adj. OOM_adj is determined via a variety of different functions on different mobile platforms. In an example, the OOM_adj value is a score created by the OS Activity Manager. The score is derived from a number of factors including: 1) the age of the application; 2) how much memory does the application consume; 3) how long since the application was in the foreground; 4) how critical the application is to system operation; and 5) various other considerations. The LMK process uses the OOM_adj score to determine which apps should be killed when the system comes under memory pressure. None of the current LMK factors are relative to application launch time. However, for example, at least one mobile platform addresses a special case; LMK tries to keep the current foreground application and the previous foreground application alive (e.g., resident in memory) by giving them better OOM_adj scores. While this technique helps to improve user experience, especially on devices with limited system memory, it doesn't go far enough. Consider, a user is playing a slow-to-launch game and receives an SMS message. The user switches out (e.g., swaps from foreground to background) the game to read the SMS message from a messaging application. The user then decides to post something via a social media application. The game is now the third most recently used application and, in the traditional OOM_adj, is given no special consideration for keeping it alive by the LMK. If the system is under memory pressure, the game will have a high traditional OOM_adj score because it consumes a large amount of memory and therefore is likely to be killed. Thus, when the user moves back to play the game, the game would launch "from scratch," negatively impacting the user experience.

What is needed is a modification to OOM_adj that accounts for an application's launch time. Launch time for an application is directly linked to user experience; the less time a user perceives an application's launch takes, the better the user perceives the experience of interacting with the platform. Thus, given two applications with similar traditional OOM_adj scores, the application that takes less time to launch should be killed first. Or, to state it another way, by properly considering application launch time, any application with long launch time will be harder to be killed than before. This modification allows for efficient use of memory while enhancing the user experience, causing the system to appear more responsive to the user. Additional details and examples are provided below.

FIG. 1 is a block diagram of an example of device 100 for memory management, according to an embodiment. The device 100 includes an OOM adjuster 105, an LMK 110 communicatively coupled to a fine tuning table 115 when in operation, and a memory subsystem 130. The components of the device 100 described herein are implemented in computer hardware such as that described below with respect to FIG. 4 (e.g., circuitry).

The OOM adjustor 105 is arranged to obtain (e.g., retrieve, receive, calculate, etc.) a launch-time weight for a process. In an example, to obtain the launch-weight, the OOM adjustor is arranged to obtain a launch time for the process and calculate the launch-time weight from the launch timer. In this example, the launch time is the time taken (e.g., elapsed, consumed, etc.) to launch (e.g., start) the process. To obtain the launch time, the device 100 may include an event parser 120 (e.g. OS event parser) that is arranged to observe (e.g., subscribe to) OS event messages or events from an OS event manager 135. These OS event messages will include process start times and process start completion times. The event parser 120 may then record the observed event messages in the history database 125. Once the messages are in the history database 125, the OOM adjustor 105 is arranged to calculate the launch time from the process start time and the process start completion time (e.g., by subtracting the former from the later) from the history database 125. In an example, once the calculation is complete, the OOM adjustor 125 is arranged to store the launch time for the application in the history database 125 or the fine tuning table 115.

In an example, the event messages processed by the event parser 120 include a process start type. Generally there are three process start types available, resume, warm launch, and cold launch. A resuming process has all of its state still resident in memory and is brought to the foreground (e.g., swapped in or the like). A resuming application was never killed, but rather running in the background. In an example, the event parser 120 filters these messages such that they are not processed further. A warm launch is for an application that was killed but has state information maintained in a cache, the cache used to initialize state. A cold launch is equivalent to starting an application for the first time. In an example, the event parser 120 is arranged to store the process start type, for example, in the history database 125 or the fine tuning table 115. In an example, the history database 125 is maintained in persistent storage, surviving, for example, a device restart. In an example, the fine tuning table 115 is does not survive system restart (e.g., is stored in volatile storage or is reinitialized when the system starts). In an example, the OOM adjustor 105 is arranged to modify the launch-time weight calculation by a value that corresponds to the process start type. For example, a first constant may be assigned to a warm start and a second value may be assigned to a cold start. These constant values provide an additional tuning parameter to the launch-time weight calculation.

In an example, the OOM adjustor 105 is arranged to calculate the launch-time weight by dividing the square root of the launch time by a platform constant. A launch time threshold is then subtracted from the last result. The launch time threshold addresses a time within which the user would expect an application to launch. Thus, the launch-time weight results in favoring to keep processes that deviate from user expectations. In an example, the launch-time threshold is based on the time to resume a suspended application (e.g., the time to move a background application to the foreground). In an example, the launch-time weight is an average of resume times for applications in the device 100. In an example, the average is computed over the life of the device 105, between OS updates, or between boots.

The OOM adjustor 105 is arranged to combine the launch-time weight with a process-value to create an adjusted process-value. Here, the process-value is the traditional "badness" or OOM_adj value. Thus, the OOM adjustor modifies the traditional OOM_adj value with the launch-time weight. In an example, the OOM adjustor 105 is arranged to subtract the launch-time weight from the process-value. Thus, when the process-value for a given application is high, it is likely to be killed. When the launch time is high, the launch-time weight is large and subtracting the launch-time weight will reduce the value of the process-value, which reduces the likelihood that the process will be killed. In an example, the launch-time weight is multiplied by a constant (e.g., a tuning constant) prior to being subtracted from the process-value. This constant is a scaling factor based on the process-value, to ensure that the range of launch-time weight is compatible with the process-value (e.g., that the launch-time weight for even short launch times often is greater than the process-value for a given system).

The LMK 110 is arranged to receive a memory subsystem 130 request to free memory. As discussed above, this is likely in response to a failed allocation (e.g., alloc( ), malloc( ), etc.) of memory for a different process. The LMK 110 will use the launch-time weight to decide which of the resident processes to terminate and then terminate that process, thus free memory used by that process. This may be accomplished by, for example, sorting processes by the adjusted process-value and selecting the highest value to kill.

In an example, the LMK 110 manages the free memory of the device 100 for the memory subsystem 130. In this example, the LMK 110 is arranged to measure free memory in the device 100 and determine that the free memory has dropped below a threshold. The LMK 110 refrains from terminating the process until the free memory has dropped below the threshold.

As noted above, an advantage of this device 100 is enhanced user experience. However, there may be times when a process is terminated and the user seeks to re-start the process immediately. In this circumstances, the adjusted process-value may be modified to track the user's preferences. In an example, the LMK 110 is arranged to capture a re-launch of the terminated process by the user in a tuning table (e.g., the fine-tuning table 115 or in the history database 125). The LMK 110 (or the OOM adjustor 105) may then adjust a tuning-weight for the process, the tuning weight modifying the adjusted process-value of the process for a future determination. In an example, the tuning-weight modifies the launch-time weight corresponding to the process. As noted above, when this tuning-weight is stored in the history database 125, it will survive a reboot of the device 105, and thus persist the user's preference.

Figure 2:
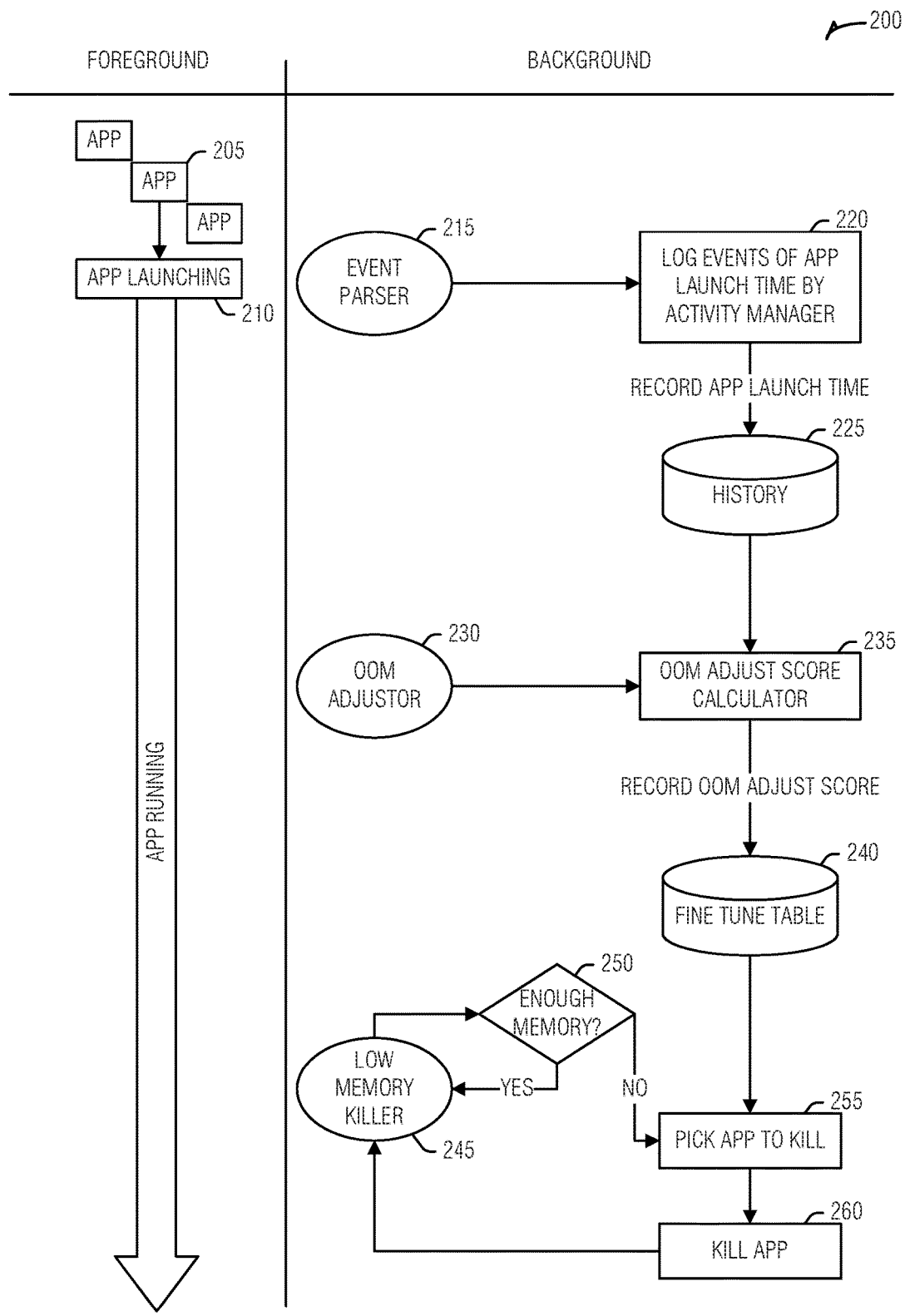
FIG. 2 is a swim lane diagram of component communication to implement memory management, according to an embodiment.

FIG. 2 is a swim lane diagram of component communication 200 to implement memory management, according to an embodiment. The left side of the swim lane illustrates several applications, including the launch of an application 205 with a given launch time 210. The right side illustrates an example of the memory management technique via component communication in a memory system of a device.

An OS least recently used (LRU) list is used to identify applications to kill to free memory, such as application 205. The LRU values are combined with the launch time 210 of the application 205 to ultimately determine whether to kill the application 205. Thus, if an application takes long time to load, then it may not be the first choice to kill. To achieve this end, each application's launch time is recorded and used to identify a new weight of each application. Then the weight is used to influence the traditional OOM_adj. Applications that which take longer to launch will be harder to kill by system, and thus enhance LMK operations to be more user-orientated and provide a better user experience.

The event parser 215 gets OS event data. The event data is parsed to get launch time and launch type of each application (e.g., operation 220). As described above, every application has three different "launch times" to count: 1) Cold launch—the first launch of an application that calls onCreate( ), which performs all of the initialization and startup; 2) Warm launch—the application was killed, but cache still exists in memory—that calls onRestart( ), reinitializing missing values; and 3) Resume—the application is still running in background—that calls onResume( ), everything is already loaded and the application is moved to the foreground. Here resume data will be dropped (e.g., ignored) by the event parser 215. Cold launch and Warm launch times will be recorded for each process, application, or application package identifier (e.g., name, hash, etc.) in the history database 225 for future use.

The OOM adjustor 230 is a modification of traditional OOM adjustment mechanisms. The OOM adjustor 230 implements a new Weights Evaluation Algorithm that extends the original basic OOM Adjust infrastructure of, for example, Linux. The OOM adjustor 230 analyzes the launch time of each application and calculates the weights using that launch time. First, the OOM adjustor 230 calculates the weighted application's launch time. In an example, the following formula is used:

$$\text{Weight} = \left(\frac{2\sqrt{T}}{N} - k\right)j$$

Where Weight is the result of each application, T is the application launch time, N is a platform related constant, k is the launch time threshold (e.g., how long moving application to from the background to the foreground takes, such as the average resume time), and j is a cold/warm launch flag. Once the weight value is calculated, the OOM adjustor 230 combines the application identifier and weight value, saving the result as OOM_adj in the Fine Tune Table 240.

The LMK 245 controls when to send a request to set the OOM_adj value and get feedback of user behavior and system status. The feedback may also fill into History Buffer to change and optimize the weight of each application. The LMK 245 tests whether there is enough memory (e.g., decision 250). If there is not enough memory, the LMK 245 selects a process from the LRU to kill based on the OOM_adj value incorporating the launch time of the applications (e.g., operation 255). Once the application is selected, the LMK 245 terminates the application (e.g., operation 260. For example, when "minfree" of a process reaches one of the thresholds defined in /sys/module/lowmemorykiller/parameters/minfree, the OS kernel may seek (e.g., request) the OOM_adj value and compare it to this minfree threshold. Any process with an OOM_adj score greater than or equal to the OOM_adj will be a candidate for termination. To avoid the applications with long launch times from being easily killed, the LMK 245 may apply the following formula:

New_OOM_adj=Current_OOM_adj−(Weight*c)

Where c is the constant to keep the Weight reasonable to OOM_adj (e.g., Current_OOM_adj). Thus, anytime the OOM_adj is changed by the ActivityManagerService, this technique transforms the OOM_adj to a more user friendly value, causing long start-up applications to be sticky (e.g., remain) in memory enhancing the user's experience.

The LMK 245 may also implement a feedback interface. For example, any user behavior (e.g., restarting an application, frequency of application use, user input indicating importance of application, etc.) may be recorded into the Fine Tune Table 240 or the History database 225. The recordation permits additional weight to be subtracted from the OOM_adj score to cause these applications to be more responsive to user needs.

Figure 3:
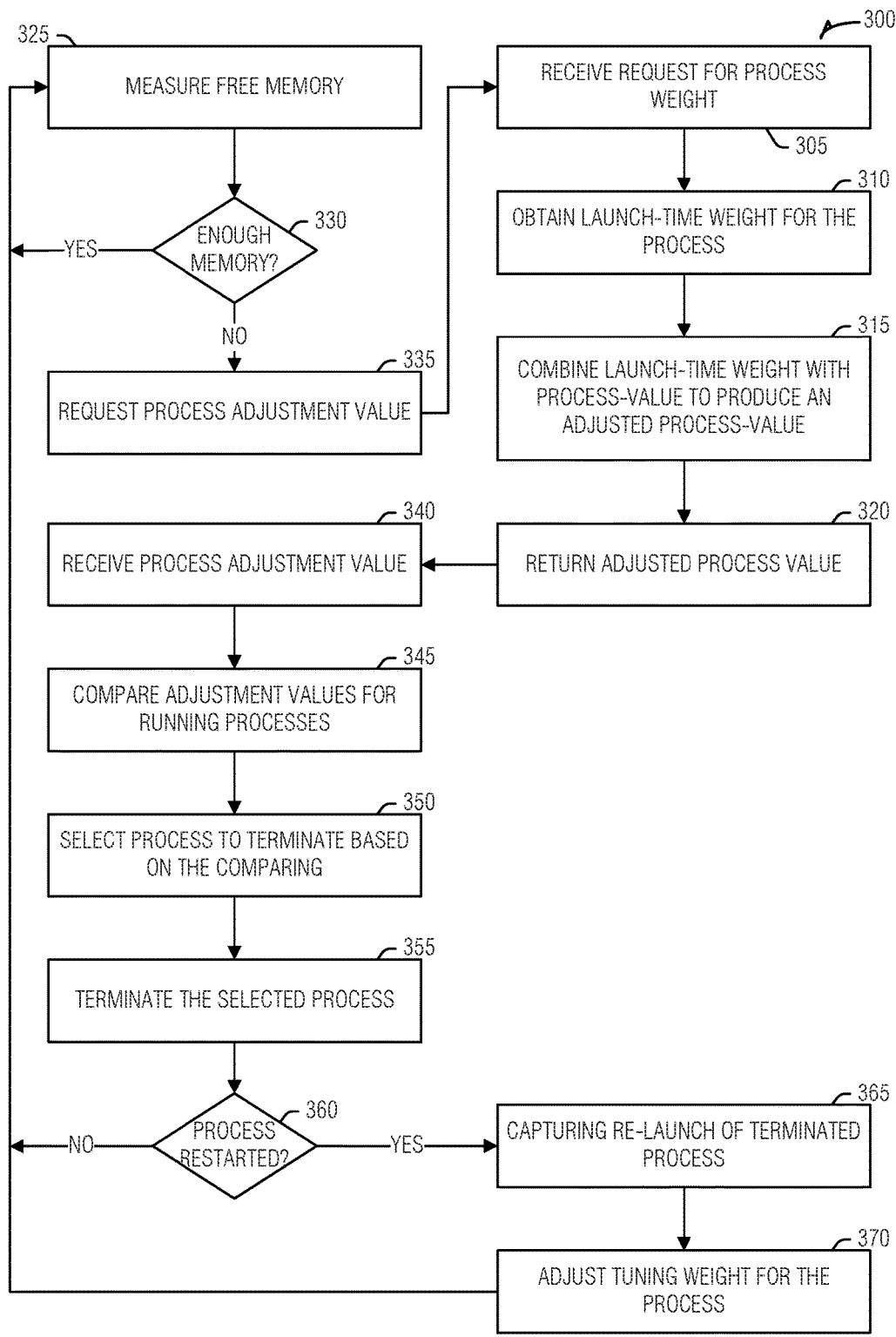
FIG. 3 illustrates an example of a method for memory management, according to an embodiment.

FIG. 3 illustrates an example of a method 300 for memory management, according to an embodiment. The operations of the method 300 are carried out by computer hardware, such as that described above with respect to FIG. 1 and below with respect to FIG. 4 (e.g., circuitry).

At operation 305, a request for an adjusted process-value for a process is received. Here, the adjusted process-value is used to compare resident processes to determine which resident process will be terminated.

At operation 310, in response to the request for the adjusted process-value, a launch-time weight for the process is obtained. In an example, obtaining the launch-weight for the process includes obtaining a launch time for the process and calculating the launch-time weight from the launch time. Here, the launch time is the process took to launch (e.g., the difference between the time the process was fully running and when it was started).

In an example, obtaining the launch time for the process includes observing operating system event messages, calculating the launch time from the process start time and the process start completion time, and recording the launch time for the process, Here, the event messages including process start time and process start completion time. In an example, the event messages include a process start type of either warm launch or cold launch, and recording the launch time includes recording the process start type. In an example, calculating the launch-time weight includes modifying the calculation by a value corresponding to the process start type.

In an example, calculating the launch-time weight includes dividing the square root of the launch time by a platform constant and then subtracting a launch-time threshold from the result. In an example, the launch-time threshold is based on the time to resume a suspended application. In an example, the launch-time threshold is an average of resume times for applications in the system. In an example, combining the launch-time weight with the process-value includes subtracting the launch-time weight from the process-value. In an example, the weight is multiplied by a constant prior to being subtracted. Here, the constant is a scaling factor based on the process-value.

At operation 315, the launch-time weight is combined with a process-value to create an adjusted process-value.

At operation 320, the adjusted process-value is returned to the requestor.

The following operations are optional extensions to the method 300, performing a more complete portion of, for example, an LMK.

At operation 325, free memory in a system is measured.

At decision 330, if there is enough free memory, the monitoring of operation 325 continues. Otherwise, the method 300 proceeds to operation 335. In an example, the determination of whether or not there is enough free memory may be made by comparing the free memory to a threshold, determining that there is insufficient free memory when the free memory value is below the threshold.

At operation 335, the request for the adjusted process-value is provided (e.g., published or otherwise made available, sent, etc.) to the implementer of operation 305.

At operation 340, the adjusted process-value is received (e.g., returned, transmitted to, etc.) from the implementer of operation 320.

At operation 345, a plurality of processes are compared based on corresponding received adjusted process-values for the processes.

At operation 350, a process to terminate is selected based on the comparing of the plurality of processes. In an example, the process with the largest corresponding adjusted process-value is selected.

At operation 355, the selected process is terminated.

The following operations are optional extensions to the method 300 to implement the user feedback mechanism described above.

At decision 360, it is determined whether user feedback was provided. For example, did the user restart the process? If no user feedback is received, the method 300 proceeds to operation 325. If user feedback was received, the method 300 proceeds to operation 365.

At operation 365, a re-launch of the process by a user—or other user feedback concerning the process—is captured and stored in a tuning table.

At operation 370, a tuning-weight for the process is adjusted based on the capture of the user feedback. Here, the tuning-weight is applied to modify a launch-time weight corresponding to the process. In an example, adjusting the tuning-weight includes updating a persistent storage. Here, the persistent storage is arranged to last beyond a reboot of the system.

Figure 4:
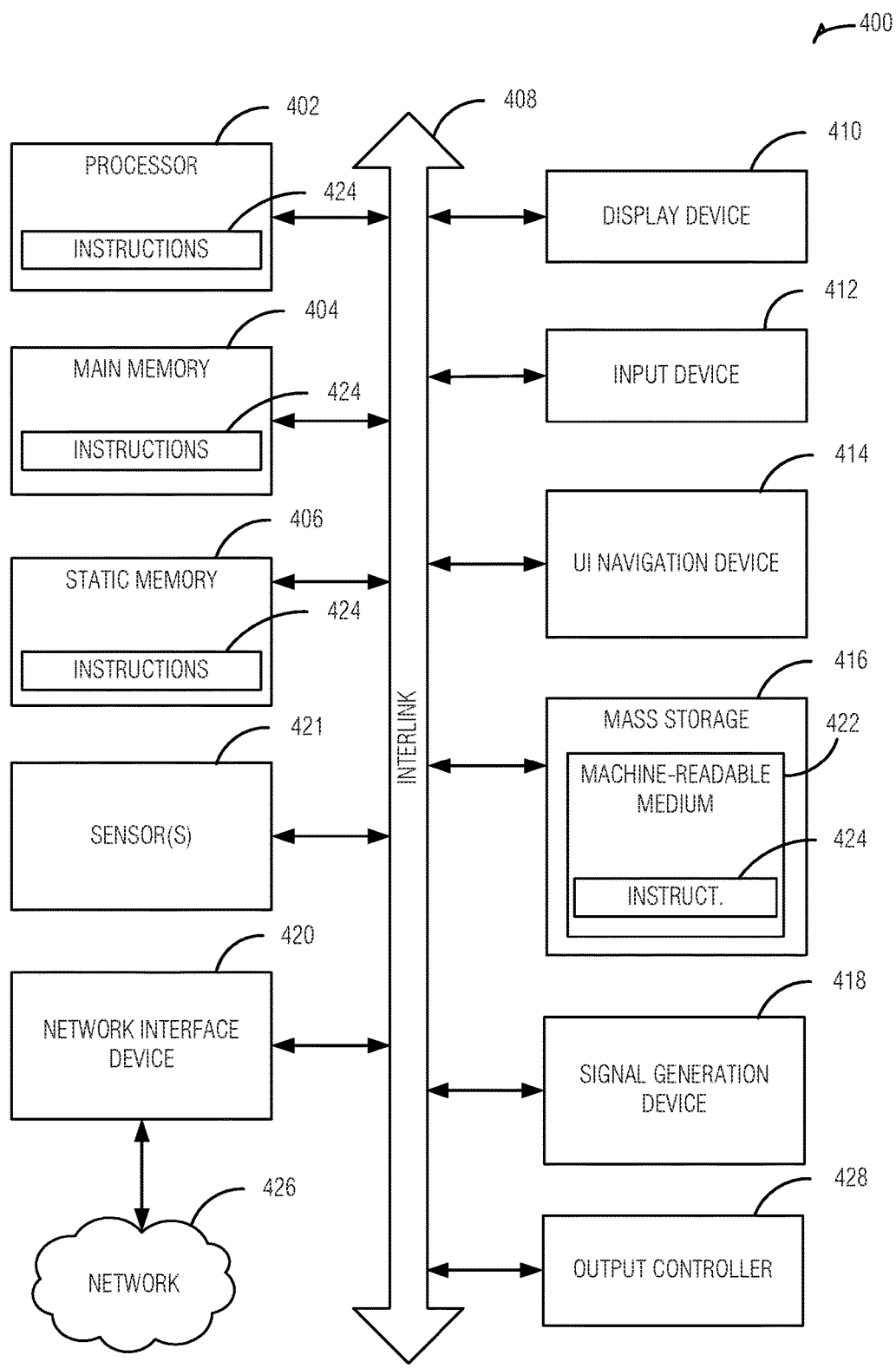
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

Additional Notes & Examples

Example 1 is a component for memory management in a device, the component comprising: an out-of-memory (OOM) adjustor to: obtain a launch-time weight for a process; and combine the launch-time weight with a process-value to create an adjusted process-value; and a low-memory killer to: receive a memory subsystem request to free memory; identify a process from a plurality of resident processes based on the launch-time weight; and terminate the process.

In Example 2, the subject matter of Example 1 optionally includes wherein to obtain the launch-weight for the process includes the OOM adjustor to: obtain a launch time for the process, the launch time being the time taken to launch the process; and calculate the launch-time weight from the launch time.

In Example 3, the subject matter of Example 2 optionally includes an operating system (OS) event parser to: observe OS event messages, the event messages including process start time and process start completion time; and record the event messages in a history database, wherein the OOM adjustor is to: calculate the launch time from the process start time and the process start completion time form the history database; and record the launch time for the process in a fine-tuning table.

In Example 4, the subject matter of Example 3 optionally includes wherein the event messages include a process start type of either warm launch or cold launch, and wherein to record the launch time includes the OS event parser to record the process start type.

In Example 5, the subject matter of Example 4 optionally includes wherein to calculate the launch-time weight includes the OOM adjustor to modify the calculation by a value corresponding to the process start type.

In Example 6, the subject matter of any one or more of Examples 2-5 optionally include wherein to calculate the launch-time weight includes the OOM adjustor to divide the square root of the launch time by a platform constant and then subtract a launch-time threshold.

In Example 7, the subject matter of Example 6 optionally includes wherein the launch-time threshold is based on the time to resume a suspended application.

In Example 8, the subject matter of Example 7 optionally includes wherein the launch-time threshold is an average of resume times for applications in the device.

In Example 9, the subject matter of any one or more of Examples 6-8 optionally include wherein to combine the launch-time weight with the process-value includes the OOM adjustor to subtract the launch-time weight from the process-value.

In Example 10, the subject matter of Example 9 optionally includes wherein the weight is multiplied by a constant prior to being subtracted, the constant being a scaling factor based on the process-value.

In Example 11, the subject matter of any one or more of Examples 1-10 optionally include wherein the low-memory killer is to measure free memory in a device and determine that the free memory has dropped below a threshold before terminating the process.

In Example 12, the subject matter of Example 11 optionally includes wherein the low-memory killer is to: capture a re-launch of the process by a user in a tuning table; and adjust a tuning-weight for the process, the tuning-weight modifying a launch-time weight corresponding to the process.

In Example 13, the subject matter of Example 12 optionally includes wherein to adjust the tuning-weight includes the low-memory killer to adjust a history database, the history database lasting beyond a reboot of the device.

Example 14 is a method for memory management in a system, the method comprising: receiving a request for an adjusted process-value for a process, the adjusted process-value used to compare resident processes to determine which resident process will be terminated; obtaining, in response to the request for the adjusted process-value, a launch-time weight for the process; combining the launch-time weight with a process-value to create an adjusted process-value; and returning the adjusted process-value to the requestor.

In Example 15, the subject matter of Example 14 optionally includes wherein obtaining the launch-weight for the process includes: obtaining a launch time for the process, the launch time being the time taken to launch the process; and calculating the launch-time weight from the launch time.

In Example 16, the subject matter of Example 15 optionally includes wherein obtaining the launch time for the process includes: observing operating system event messages, the event messages including process start time and process start completion time; calculating the launch time from the process start time and the process start completion time; and recording the launch time for the process.

In Example 17, the subject matter of Example 16 optionally includes wherein the event messages include a process start type of either warm launch or cold launch, and wherein recording the launch time includes recording the process start type.

In Example 18, the subject matter of Example 17 optionally includes wherein calculating the launch-time weight includes modifying the calculation by a value corresponding to the process start type.

In Example 19, the subject matter of any one or more of Examples 15-18 optionally include wherein calculating the launch-time weight includes dividing the square root of the launch time by a platform constant and then subtracting a launch-time threshold.

In Example 20, the subject matter of Example 19 optionally includes wherein the launch-time threshold is based on the time to resume a suspended application.

In Example 21, the subject matter of Example 20 optionally includes wherein the launch-time threshold is an average of resume times for applications in the system.

In Example 22, the subject matter of any one or more of Examples 19-21 optionally include wherein combining the launch-time weight with the process-value includes subtracting the launch-time weight from the process-value.

In Example 23, the subject matter of Example 22 optionally includes wherein the weight is multiplied by a constant prior to being subtracted, the constant being a scaling factor based on the process-value.

In Example 24, the subject matter of any one or more of Examples 14-23 optionally include measuring free memory in a system and determining that the free memory has dropped below a threshold; providing the request for the adjusted process-value; receiving the adjusted process-value; comparing a plurality of processes based on corresponding received adjusted process-values including the adjusted process-value; selecting a process to terminate based on the comparing of the plurality of processes; and terminating the process.

In Example 25, the subject matter of Example 24 optionally includes capturing a re-launch of the process by a user in a tuning table; and adjusting a tuning-weight for the process based on capturing the re-launch of the process, the tuning-weight modifying a launch-time weight corresponding to the process.

In Example 26, the subject matter of Example 25 optionally includes wherein adjusting the tuning-weight includes updating a persistent storage, the persistent storage lasting beyond a reboot of the system.

Example 27 is at least one machine readable medium that, when executed by a machine, causes the machine to perform any of the methods of Examples 14-26.

Example 28 is a device comprising means to perform any of the methods of Examples 14-26.

Example 29 is a component for memory management in a system, the component comprising: means for receiving a memory system request for a adjusted process-value for a process, the adjusted process-value used by the memory subsystem to compare resident processes to determine which resident process will be terminated; means for obtaining, in response to the request for the adjusted process-value, a launch-time weight for the process; means for combining the launch-time weight with a process-value to create an adjusted process-value; and means for returning the adjusted process-value to the memory subsystem.

In Example 30, the subject matter of Example 29 optionally includes wherein the obtaining the launch-weight for the process include: means for obtaining a launch time for the process, the launch time being the time taken to launch the process; and means for calculating the launch-time weight from the launch time.

In Example 31, the subject matter of Example 30 optionally includes wherein the means for obtaining the launch time for the process include: means for observing operating system event messages, the event messages including process start time and process start completion time; means for calculating the launch time from the process start time and the process start completion time; and means for recording the launch time for the process.

In Example 32, the subject matter of Example 31 optionally includes wherein the event messages include a process start type of either warm launch or cold launch, and wherein the means for recording the launch time include means for recording the process start type.

In Example 33, the subject matter of Example 32 optionally includes wherein the means for calculating the launch-time weight include means for modifying the calculation by a value corresponding to the process start type.

In Example 34, the subject matter of any one or more of Examples 30-33 optionally include wherein the means for calculating the launch-time weight include means for dividing the square root of the launch time by a platform constant and then subtracting a launch-time threshold.

In Example 35, the subject matter of Example 34 optionally includes wherein the launch-time threshold is based on the time to resume a suspended application.

In Example 36, the subject matter of Example 35 optionally includes wherein the launch-time threshold is an average of resume times for applications in the system.

In Example 37, the subject matter of any one or more of Examples 34-36 optionally include wherein the means for combining the launch-time weight with the process-value includes means for subtracting the launch-time weight from the process-value.

In Example 38, the subject matter of Example 37 optionally includes wherein the weight is multiplied by a constant prior to being subtracted, the constant being a scaling factor based on the process-value.

In Example 39, the subject matter of any one or more of Examples 29-38 optionally include means for measuring free memory in a system and determining that the free memory has dropped below a threshold; means for providing, from the memory subsystem, the request for the adjusted process-value; means for receiving, by the memory subsystem, the adjusted process-value; means for comparing a plurality of processes based on corresponding received adjusted process-values including the adjusted process-value; means for selecting a process to terminate based on the comparing of the plurality of processes; and means for terminating the process.

In Example 40, the subject matter of Example 39 optionally includes means for capturing a re-launch of the process by a user in a tuning table; and means for adjusting a tuning-weight for the process, the tuning-weight modifying a launch-time weight corresponding to the process.

In Example 41, the subject matter of Example 40 optionally includes wherein the means for adjusting the tuning-weight include means for updating a persistent storage, the persistent storage lasting beyond a reboot of the system.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A component for memory management in a device, the component comprising:
   an out-of-memory (OOM) adjustor to:
      obtain a launch-time weight for a process, including the OOM adjustor to:
         obtain a launch time for the process, the launch time being the time taken to launch the process; and
         calculate the launch-time weight from the launch time, including division of a square root of the launch-time by a platform constant and then subtraction of a launch-time threshold; and
      combine the launch-time weight with a process-value to create an adjusted process-value; and
   a low-memory killer to:
      receive a memory subsystem request to free memory;
      identify a process from a plurality of resident processes based on the launch-time weight; and
      terminate the process.

2. The component of claim 1 comprising an operating system (OS) event parser to:
   observe OS event messages, the event messages including process start time and process start completion time; and
   record the event messages in a history database, wherein the OOM adjustor is to:
   calculate the launch time from the process start time and the process start completion time form the history database; and
   record the launch time for the process in a fine-tuning table.

3. The component of claim 2, wherein the event messages include a process start type of either warm launch or cold launch, and wherein to record the launch time includes the OS event parser to record the process start type.

4. The component of claim 3, wherein to calculate the launch-time weight includes the OOM adjustor to modify the calculation by a value corresponding to the process start type.

5. The component of claim 1, wherein the launch-time threshold is based on the time to resume a suspended application.

6. The component of claim 5, wherein the launch-time threshold is an average of resume times for applications in the device.

7. The component of claim 1, wherein to combine the launch-time weight with the process-value includes the OOM adjustor to subtract the launch-time weight from the process-value.

8. The component of claim 7, wherein the weight is multiplied by a constant prior to being subtracted, the constant being a scaling factor based on the process-value.

9. A method for memory management in a system, the method comprising:
   receiving a request for an adjusted process-value for a process, the adjusted process-value used to compare resident processes to determine which resident process will be terminated;
   obtaining, in response to the request for the adjusted process-value, a launch-time weight for the process, wherein obtaining the launch-weight for the process includes:
      obtaining a launch time for the process, the launch time being the time taken to launch the process; and
      calculating the launch-time weight from the launch time by dividing a square root of the launch-time by a platform constant and then subtracting a launch-time threshold;
   combining the launch-time weight with a process-value to create an adjusted process-value; and
   returning the adjusted process-value to the requestor.

10. The method of claim 9, wherein the launch-time threshold is based on the time to resume a suspended application.

11. The method of claim 9, wherein combining the launch-time weight with the process-value includes subtracting the launch-time weight from the process-value.

12. At least one machine readable medium including instructions for memory management in a system, the instructions, when execute by a machine, cause the machine to:
  receive a memory system request for a adjusted process-value for a process, the adjusted process-value used by the memory subsystem to compare resident processes to determine which resident process will be terminated;
  obtain, in response to the request for the adjusted process-value, a launch-time weight for the process wherein to obtain the launch-weight for the process, the instructions cause the machine to:
    obtain a launch time for the process, the launch time being the time taken to launch the process; and
    calculate the launch-time weight from the launch time by dividing a square root of the launch-time by a platform constant and then subtracting a launch-time threshold;
  combine the launch-time weight with a process-value to create an adjusted process-value; and
  return the adjusted process-value to the memory subsystem.

13. The at least one machine readable medium of claim 12, wherein the instructions to obtain the launch time for the process include instructions that cause the machine to:
  observe operating system event messages, the event messages including process start time and process start completion time;
  calculate the launch time from the process start time and the process start completion time; and
  record the launch time for the process.

14. The at least one machine readable medium of claim 13, wherein the event messages include a process start type of either warm launch or cold launch, and wherein the instructions to record the launch time include instructions that cause the machine to record the process start type.

15. The at least one machine readable medium of claim 14, wherein the instructions to calculate the launch-time weight include instructions that cause the machine to modify the calculation by a value corresponding to the process start type.

16. The at least one machine readable medium of claim 12, wherein the launch-time threshold is based on the time to resume a suspended application.

17. The at least one machine readable medium of claim 16, wherein the launch-time threshold is an average of resume times for applications in the system.

18. The at least one machine readable medium of claim 12, wherein the instructions to combine the launch-time weight with the process-value include instructions that cause the machine to subtract the launch-time weight from the process-value.

19. The at least one machine readable medium of claim 18, wherein the weight is multiplied by a constant prior to being subtracted, the constant being a scaling factor based on the process-value.

\* \* \* \* \*

UNITED STATES PATENT AND TRADEMARK OFFICE
CERTIFICATE OF CORRECTION

PATENT NO. : 10,133,601 B2
APPLICATION NO. : 15/086631
DATED : November 20, 2018
INVENTOR(S) : Apparao et al.

Page 1 of 1

It is certified that error appears in the above-identified patent and that said Letters Patent is hereby corrected as shown below:

In the Claims

Column 15, Line 10, Claim 12, delete "process" and insert --process,-- therefor

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*